(12) United States Patent
Agshikar et al.

(10) Patent No.: US 12,119,997 B1
(45) Date of Patent: Oct. 15, 2024

(54) SCALING SERVICE CAPACITY

(71) Applicant: Amazon Technologies, Inc., Seattle, WA (US)

(72) Inventors: Abhinav A Agshikar, Bothell, WA (US); Ankur Goenka, Sammamish, WA (US); Bhavya Gupta, Snohomish, WA (US); Atul Agarwal, Seattle, WA (US); Manish Kumar Shukla, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/211,875

(22) Filed: Jun. 20, 2023

(51) Int. Cl.
*H04L 41/0897* (2022.01)

(52) U.S. Cl.
CPC ............... *H04L 41/0897* (2022.05)

(58) Field of Classification Search
None
See application file for complete search history.

(56) References Cited

U.S. PATENT DOCUMENTS

| | | | |
|---|---|---|---|
| 10,733,085 B1 * | 8/2020 | Wagner | G06F 11/3688 |
| 11,113,120 B1 * | 9/2021 | Greenfield | G06F 9/4881 |
| 2016/0323377 A1 * | 11/2016 | Einkauf | H04L 41/22 |
| 2022/0174096 A1 * | 6/2022 | Schmitt | H04L 63/062 |

* cited by examiner

*Primary Examiner* — June Sison
(74) *Attorney, Agent, or Firm* — Kilpatrick Townsend & Stockton LLP

(57) ABSTRACT

A scaling system is disclosed. The scaling system scales services for a high velocity event. To manage the scaling, a hierarchy of instruction routing network nodes is generated. The instruction routing network nodes provide scaling instructions to some of the services for the HVE. Some of the instruction routing network nodes generate or forward scaling instructions to down hierarchy instruction routing network nodes.

20 Claims, 6 Drawing Sheets

SCALING SERVICE CAPACITY

The subject matter described herein relates to scaling of services, for example, for high velocity events, and more particularly to automatic scaling for the high velocity events.

Service providers face significant difficulties as demand for the services may vary significantly over time. Service providers use manual scaling efforts to scale up their services to support peaks and scale down post peak events. Accordingly, service providers risk insufficient capacity to provide services during peak demand. In addition, significant effort is needed to coordinate resources for providing services. Improved scaling methods are needed in the art.

BRIEF DESCRIPTION OF THE DRAWINGS

Various embodiments in accordance with the present disclosure will be described with reference to the drawings, in which.

DETAILED DESCRIPTION

Figure 1:
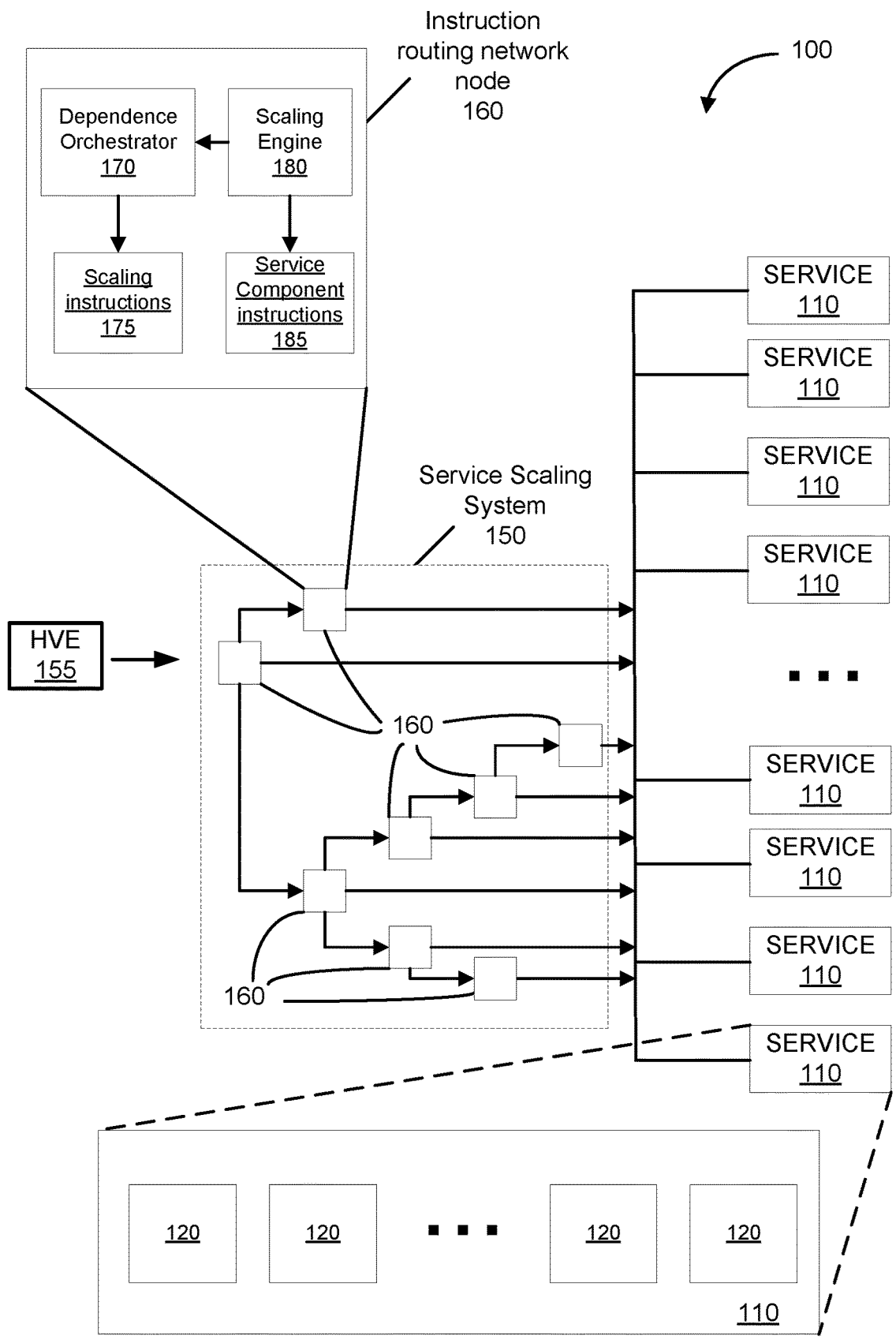
FIG. 1 is a schematic block diagram illustrating a service providing system having a scaling system for automatically scaling a number of service components.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include strategies and systems which are used to scale a service, for example, in response to a planned or unexpected surge in usage. In some embodiments, the service scaling solution defines, creates, and/or manages a network of instruction routing network nodes that are organized according to functionality characteristics. The service scaling system has a well-defined boundary of action, acting as a cohesive unit that scales a set of services, and corresponding resources governing a particular function (for example, Payments API). The service scaling system is able to create a unique configuration of instruction routing network nodes for each or all scaling events, such as adaptive scaling events, unknown reactive scaling events, multiple overlapping scaling events, as well as pre-planned high velocity events, or high demand peaks.

The service scaling system includes a programmable scaling interface and a network of instruction routing network nodes, where each instruction routing network node includes a dependence orchestrator and a scaling engine. The interface provides options to define a scaling specification at an origin service where the scaling starts. The scaling specification causes or specifies a request to an initial scaling engine of an initial instruction routing network node that is responsible for cross platform scaling of, for example, compute and data planes to ensure the specific origin service is scheduled to scale and descale. Additionally, an initial dependence orchestrator within the initial instruction routing network node dynamically calculates, for example, scaling requirements for downstream instruction routing network nodes scoped as part of the scaling and then propagates the appropriate scaling requests to the downstream instruction routing network nodes. This process is repeated at each downstream instruction routing network node, thereby scaling the entire set of services with a single intervention at the scaling interface. In addition, in some embodiments, once the services have been partially or completely scaled or partially or completely scheduled for scaling, the network of instruction routing network nodes provides a scaling notification to the scaling interface.

The embodiments described herein are described with reference to a high velocity event (HVE), for example, during which an increased demand for service capacity is required to meet the needs of related to providing the service. It will be understood by those of skill in the art that the principles and aspects of the embodiments may be applied to situations during which a decreased demand for service capacity is preferred, for example, to free up resources for other demands. For example, once an HVE has concluded, the principles and aspects of the embodiments may be used to scale down the service capacity.

FIG. 1 is a schematic block diagram illustrating a service providing system 100 having a service scaling system 150 which automatically scales services provided by a number of service components 110 based on information regarding a high velocity event (HVE) 155. The information of the HVE 155 may be sourced to service scaling system 150 at least partly by, for example, a scaling interface. Service scaling system 150 may include one or more processors configured to execute instructions stored in a memory to perform the functions of the service scaling system 150, and can be implemented, for example, as a server, as a cloud computing service, for example, hosted in a data center, etc. In some embodiments, service scaling system 150 includes or generates a hierarchy of instruction routing network nodes 160 to automatically scale the services provided by service components 110. In some embodiments, service components 110 are implemented with or integrated with the instruction routing network nodes 160. For example, the hardware used to implement service components 110 may also be used to implement the instruction routing network nodes 160. In some embodiments, first hardware used to implement a first service component 110 is also used to implement a corresponding first instruction routing network node 160. In some embodiments, second hardware used to implement a second service component 110 is also used to implement a corresponding second instruction routing network node 160. In some embodiments, the first hardware is different from the second hardware. In some embodiments, the hierarchy is generated in response to the information of the HVE 155. In some embodiments, one or more instruction routing network nodes 160 is removed in response to a scaling notification indicating that the service components 110 have been scaled. In some embodiments, one or more instruction routing network nodes 160 is removed in response to a scaling notification indicating that the service components 110 have been scheduled for scaling. In some embodiments, one or more instruction routing network nodes 160 is removed in response to a notification indicating that the HVE 155 has commenced. In some embodiments, one or more instruction routing network nodes 160 is removed in response to a notification indicating that the HVE 155 has completed.

Service components 110 may be used by a service provider to provide scalable services according to some embodiments. Each of the service components 110 performs a service function. The service provider determines which of the service components 110 are to be used for a particular scalable service to be provided by the service provider. For example, a number of services components 110 may be used for a high velocity event, where the services include one or more of: services responsible for a website where a user can sign-up for viewing an HVE 155, payments, related data entry, related preferences and defaults, and stored preferences.

Each of the service components 110 has or manages or uses a number of resources 120 to perform the service function assigned thereto as part of the scalable service provided by the service provider. For example, a number of resources 120 may be used by the services components 110 for a high velocity event, where the resources 120 include one or more of: compute servers such as bare-metal servers hosted on Amazon Web Services (AWS) EC2, data storage/persistence services hosted, for example, on AWS DynamoDB, AWS S3, workflow orchestration services hosted, for example, on AWS Step Function. For some of the service components 110, the required resources 120 scale heavily with consumer volume for a particular event. Accordingly, assignment of excessive service components 110 is especially disadvantageous. However, assignment of insufficient service components 110 is also disadvantageous, as service capacity shortages would result. Embodiments discussed herein provide automatic or partially automatic scaling of service components 110, for example, for scaling up for planned and for unexpected high velocity events, and for scaling down from the high velocity events.

As an example, a streaming video service provider may determine that a number of services components 110 are to be used by a high velocity event, where the services include, for example, one or more of: a data entry service using, for example, compute resources, a preference service using, for example, compute and storage resources, and a stored preferences using, for example, compute and storage resources.

To automatically scale up for a planned or unexpected high velocity event, which service components 110 are used, and how the high velocity event affects each of the service components 110 is determined.

Service scaling system 150 receives the HVE information, for example, at least partly entered as input in an interface. In some embodiments, service scaling system 150 receives the HVE information in another way, such as from a file. In some embodiments, the HVE information provides characteristics of a current, an imminent, a future, an unexpected, or a planned high velocity event (HVE). In some embodiments, the characteristics include one or more of: a description of the HVE, a volume, an average volume, a minimum volume, a maximum volume of users receiving service in the HVE; a schedule of the HVE including, for example, start and end dates and/or times; a minimum, average, and/or maximum order rate; a pre-event schedule; and other characteristics.

Service scaling system 150 receives the information characterizing an HVE 155. Based on the HVE information, service scaling system 150 generates service scaling instructions for the service components 110 to be used for the scalable service of the HVE. To do this, the service scaling system 150 determines which service components 110 are used, and which service components 110 are to be scaled for the HVE. In some embodiments, to generate service scaling instructions, the service scaling system 150 determines which resources 120 of each used service component 110 are used, and which resources 120 of each used service component 110 are to be scaled for the HVE. In addition, in some embodiments, to generate the service scaling instructions, service scaling system 150 determines how each of the service components 110 is to scale for the HVE. In some embodiments, to generate the service scaling instructions, service scaling system 150 determines how each of the resources 120 of the service components 110 is to scale for the HVE. Furthermore, in some embodiments, for example, for planned HVE's, to generate the service scaling instructions, service scaling system 150 includes scheduling information for the service components 110 and/or resources 120 to be used for the scalable service of the HVE.

To generate the service scaling instructions for the service components 110 to be used for the scalable service of an HVE, service scaling system 150 generates and/or maintains a programmable hierarchical network of instruction routing network nodes 160 that are organized according to service functionality. The service scaling system 150 is configured to create a custom configuration of instruction routing network nodes 160 for each HVE, where each instruction routing network node 160 includes a dependency orchestrator and a service scaling engine.

Based on the received HVE information, the service scaling system 150 generates service scaling instructions for an initial instruction routing network node 160 that is responsible for delivering service component instructions to one or more of the service components 110 to be used for the HVE. In addition, the service scaling system 150 transmits the service scaling instructions to the initial instruction routing network node 160.

Based on the received service scaling instructions, the initial scaling engine of the initial instruction routing network node 160 generates service component instructions for each of the one or more service components 110 for which the initial instruction routing network node 160 is responsible. The service component instructions provide prompting information used by the service components 110. In addition, the initial scaling engine transmits the generated service component instructions to the one or more service components 110 for which the initial instruction routing network node 160 is responsible. In response to the service component instructions, the service components 110 modify or schedule modifications to their service capacity of each of the resources 120 they control.

Additionally, based on the received HVE information, an initial dependency orchestrator of the initial instruction routing network node 160 determines which, if any, additional service components 110 are to be used for the HVE, determines a set of additional instruction routing network nodes 160 to which additional service scaling instructions are to be delivered so as to cause the additional service components 110 to properly scale, generates the additional service scaling instructions for the set of additional instruction routing network nodes 160, and transmits the additional service scaling instructions to the set of additional instruction routing network nodes 160.

Based on the received service scaling instructions, the additional scaling engines of the additional instruction routing network nodes 160 each generate service component instructions for the one or more service components 110 for which each additional instruction routing network node 160 is responsible. In addition, the additional scaling engines transmit the generated service component instructions to the one or more service components 110 for which initial instruction routing network nodes 160 are responsible. In response to the service component instructions, the service components 110 modify or schedule modifications to their service capacity of each of the resources 120 they control.

In some embodiments, each particular service component 110 also transmits a scaling notification indicating that the particular service component 110 has either modified or scheduled the modification prescribed in the received scaling instructions to the scaling engine from which the scaling instructions were received. In addition, in some embodiments, one or more of the scaling engines, in response to receiving a scaling notification from a down hierarchy source (either a service component 110 or a down hierarchy scaling engine) propagates the scaling message to the up-hierarchy scaling engine from which the scaling instructions corresponding to the modification were received. In some embodiments, one or more of the scaling engines, in response to receiving a scaling notification from a down hierarchy source (either a service component 110 or a down hierarchy scaling engine) determines whether further down hierarchy sources are expected to transmit a scaling notification thereto, and propagates the scaling message to the up hierarchy scaling engine from which the scaling instructions corresponding to the modification were received on the condition that all expected scaling messages have been received. In some embodiments, the scaling engine of the instruction routing network node 160 at the top of the hierarchy transmits a scaling notification indicating that one or more or all service components 110 have either modified their capacity or scheduled modification of their capacity. In some embodiments, the scaling notification from the instruction routing network node 160 of the top of the hierarchy is transmitted to a source of the information characterizing the HVE 155, such as a scaling interface. In some embodiments, the scaling interface allows for input to modify the implemented scaling instructions. In some embodiments, modifications to the implemented scaling instructions are limited. For example, the scaling interface may restrict or not allow modifications to the implemented scaling instructions if the HVE is to occur in less than a particular time duration, for example, one day, 12 hours, 8 hours, 4 hours, 2 hours, 1 hour, 30 minutes, 15 minutes, 10 minutes, 5 minutes, 1 minute, or another time duration.

Additionally, based on the received service scaling instructions, additional dependency orchestrators of the additional instruction routing network nodes 160 determine which, if any, further service components 110 are to be used for the HVE, determines a set of further instruction routing network nodes 160 to which further service scaling instructions are to be delivered so as to cause the further service components 110 to properly scale, generates the further service scaling instructions for the set of further instruction routing network nodes 160, and transmits the further service scaling instructions to the set of further instruction routing network nodes 160.

Accordingly, each particular instruction routing network node 160 in the hierarchy provides service component instructions for the one or more service components 110 for which the particular instruction routing network node 160 is responsible, and provides service scaling instructions for one or more other instruction routing network nodes 160 responsible for one or more other service components 110, if necessary.

FIG. 1 illustrates a particular embodiment of how a service providing system is segmented. Other segmentation schemes may be used, as understood by those of skill in the art. For example, in some embodiments, each instruction routing network node 160 is integrated with or coupled to or directly coupled with or to one or more service components 110.

In some embodiments, an HVE 155 a number of service components 110 to provide the associated service. In some embodiments, in response to the information characterizing the HVE 155, the service scaling system 150 automatically causes the service capacity of all of the service components 110 needing modification for providing the service associated with the HVE 155 to be modified. In some embodiments, in response to the information characterizing the HVE 155, the service scaling system 150 automatically causes the service capacity of less than all of the service components 110 needing modification for providing the service associated with the HVE 155 to be modified, where the remainder of service components 110 needing modification are modified using another technique. For example, the remainder of service components 110 may be modified using a non-automatic process.

Figure 2:
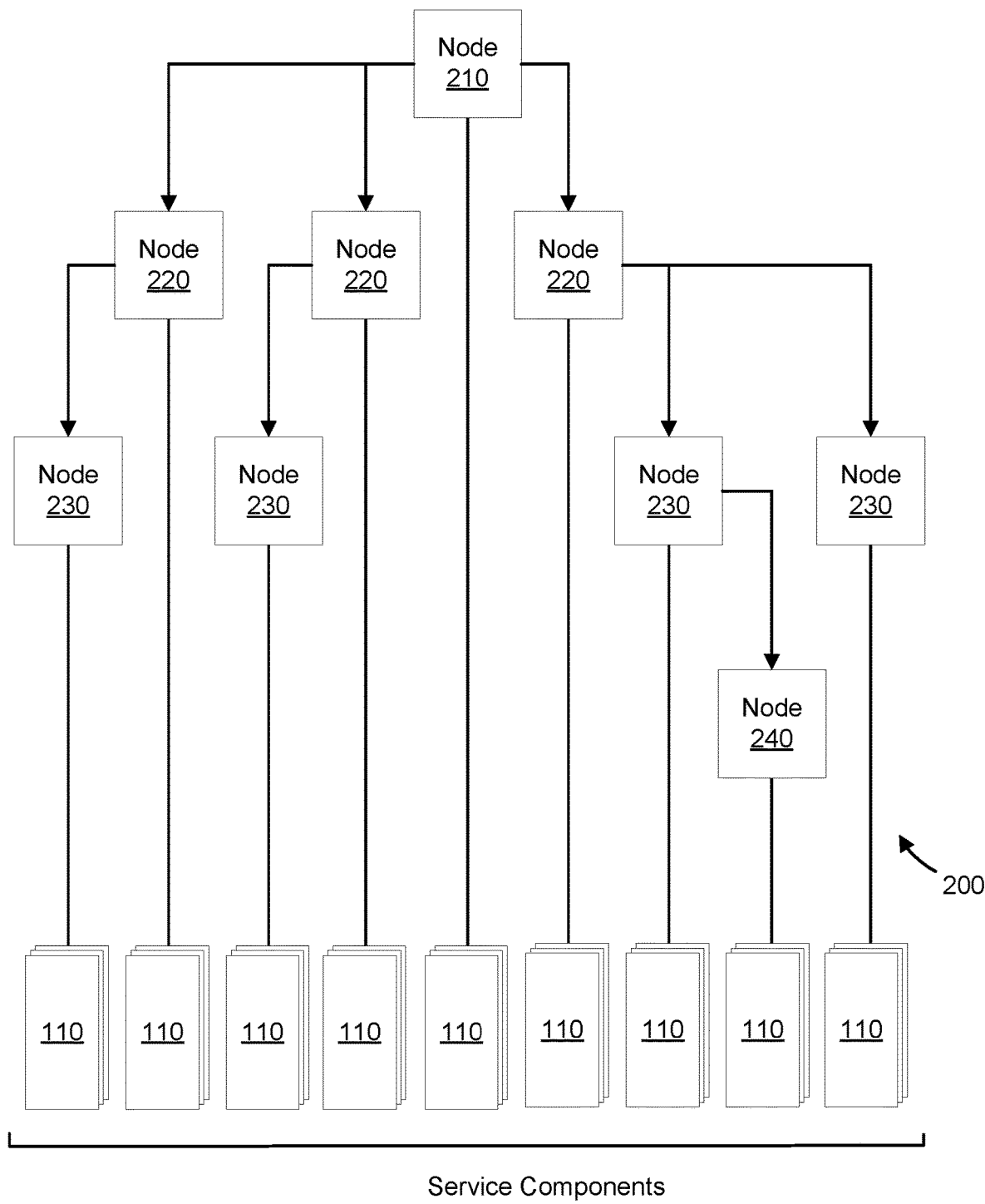
FIG. 2 is a schematic block diagram illustrating a service component which may be used to provide a particular service according to some embodiments.

FIG. 2 is a schematic block diagram illustrating a hierarchy 200 of instruction routing network nodes 210, 220, 230, and 240. Instruction routing network nodes 210, 220, 230, and 240 may be similar or identical to instruction routing network node 160. The hierarchy 200 may be used to provide service scaling instructions to a number of service components according to some embodiments. In some embodiments, the hierarchy 200 is virtually built, for example, by service scaling system 150 or by another service scaling system.

In the illustrated embodiment, there are nine instruction routing network nodes 210, 220, 230, and 240, each connected to a set of one or more service components 110. In other implementations, different numbers of instruction routing network nodes and service components are used.

In this embodiment, the highest level of the instruction routing network node hierarchy 200 includes one instruction routing network node 210. In alternative implementations, the highest level of the instruction routing network node hierarchy includes more than one instruction routing network node.

As illustrated, the instruction routing network node 210 is connected to a set of service components 110, and is additionally connected to each of the three instruction routing network nodes 220. The instruction routing network nodes 220 form the next level in the instruction routing network node hierarchy 200.

As illustrated, each of the three instruction routing network nodes 220 are connected to a set of service components 110, and are each additionally connected to one or more of the four instruction routing network nodes 230. The instruction routing network nodes 230 form the next level in the instruction routing network node hierarchy 200.

As illustrated, each of the four instruction routing network nodes 230 are connected to a set of service components 110, and one of the four instruction routing network nodes 230 is additionally connected to the one instruction routing network node 240. The instruction routing network node 240 forms the next level in the instruction routing network node hierarchy 200, and is connected to a set of service components 110.

In some embodiments, to build the instruction routing network node hierarchy 200, the service scaling system determines which service components 110 are to be used for an HVE based on descriptive information received regarding the HVE. In addition, the service scaling system may build hierarchy 200 based on logical groupings and subgroupings of the service components 110. In some embodiments, the logical groupings and subgroupings are automatically formed based on one or more shared or similar characteristics, such as functionality, responsibilities, ownership, and/or other characteristics of the service components. For example, a single function vertical may need a particular subset of available services that are used for performing the function.

In some embodiments, the instruction routing network node hierarchy 200 is programmed by a user. For example, some HVE's occur repeatedly, and a user may provide instructions to the service scaling system specifying a particular instruction routing network node hierarchy for scaling a particular set of service components 110 to be used for the repeatedly occurring HVE's.

In some embodiments, to generate service scaling instructions for instruction routing network node 210, the service scaling system 150 determines which component groupings are to be used for scaling. In some embodiments, to generate service scaling instructions for instruction routing network node 210, the service scaling system 150 determines how one or more component groupings scale, for example, using component grouping scaling factors for each affected service component grouping, where the component grouping scaling factors represent, for example, how each affected component grouping scales for a change in demand in services, for example, for the service of the HVE. In some embodiments, the service scaling system 150 does not determine how component groupings are to scale to generate the service scaling instructions for instruction routing network node 210. In some embodiments, the service scaling system 150 does not determine which component groupings are to be used for scaling to generate the service scaling instructions for instruction routing network node 210.

In some embodiments, to generate service scaling instructions for instruction routing network node 210, the service scaling system 150 determines which component subgroupings are to be used for scaling. In some embodiments, to generate service scaling instructions for instruction routing network node 210, the service scaling system 150 determines how one or more component subgroupings scale, for example, using component subgrouping scaling factors for each affected service component subgrouping, where the component subgrouping scaling factors represent, for example, how each affected component subgrouping scales for a change in demand in services, for example, for the service of the HVE, or for the services of the component grouping of the component subgroup. In some embodiments, the service scaling system 150 does not determine how component subgroupings are to scale to generate the service scaling instructions for instruction routing network node 210. In some embodiments, the service scaling system 150 does not determine which component subgroupings are to be used for scaling to generate the service scaling instructions for instruction routing network node 210.

In some embodiments, to generate service scaling instructions for instruction routing network node 210, the service scaling system 150 determines which service components are to be used for scaling. In some embodiments, to generate service scaling instructions for instruction routing network node 210, the service scaling system 150 determines how one or more service components scale, for example, using service component scaling factors for each affected service component, where the service component scaling factors represent, for example, how each affected service component scales for a change in demand in services, for example, for the service of the HVE, for the services of the component grouping of the component subgroup of the service component, or for the services of the component subgroup of the service component. In some embodiments, the service scaling system 150 does not determine how service components are to scale to generate the service scaling instructions for instruction routing network node 210. In some embodiments, the service scaling system 150 does not determine which service components are to be used for scaling to generate the service scaling instructions for instruction routing network node 210.

In some embodiments, to generate service scaling instructions for instruction routing network node 210, the service scaling system 150 determines which resources of each service component are to be used for scaling. In some embodiments, to generate service scaling instructions for instruction routing network node 210, the service scaling system 150 determines how one or more resources scale, for example, using resource scaling factors for each affected resource, where the resource scaling factors represent, for example, how each affected resource scales for a change in demand in services, for example, for the service of the HVE, for the services of the component grouping of the component subgroup of the service component of the resource, for the services of the component subgroup of the service component of the resource, or for the services of the service component of the resource. In some embodiments, the service scaling system 150 does not determine how resources are to scale to generate the service scaling instructions for instruction routing network node 210. In some embodiments, the service scaling system 150 does not determine which resources of each service component are to be used for scaling to generate the service scaling instructions for instruction routing network node 210.

The service scaling system 150 incorporates information representing the determined scaling aspects and effects in the service scaling instructions for instruction routing network node 210. Furthermore, in some embodiments, for example, for planned HVE's, the service scaling system 150 also includes scheduling information in the service scaling instructions for instruction routing network node 210.

Referring to the example of FIG. 2, the service scaling system 200 provides the service scaling instructions for instruction routing network node 210 to instruction routing network node 210.

Based on the received service scaling instructions, the scaling engine of the instruction routing network node 210 generates service component instructions for each of the one or more service components 110 for which the instruction routing network node 210 is responsible. The service component instructions provide information used by the service components 110 for scaling. In addition, the scaling engine of instruction routing network node 210 transmits the generated service component instructions to the one or more service components 110 for which the instruction routing network node 210 is responsible. In response to the service component instructions, the service components 110 modify or schedule modifications to their service capacity of each of the resources 120 they manage.

Additionally, based on the received service scaling instructions, the dependency orchestrator of the instruction routing network node 210 determines service scaling instructions for instruction routing network nodes 220.

In some embodiments, to generate service scaling instructions for instruction routing network nodes 220, the instruction routing network node 210 determines which down hierarchy component groupings are to be used for scaling. In some embodiments, to generate service scaling instructions for instruction routing network nodes 220, the instruction routing network node 210 determines how one or more down hierarchy component groupings scale, for example, using component grouping scaling factors for each affected service component grouping, where the component grouping scaling factors represent, for example, how each affected component grouping scales for a change in demand in services, for example, for the service of the HVE. In some embodiments, the instruction routing network node 210 does not determine how down hierarchy component groupings are to scale to generate the service scaling instructions for instruction routing network nodes 220. In some embodiments, the instruction routing network node 210 does not determine which down hierarchy component groupings are to be used for scaling to generate the service scaling instructions for instruction routing network nodes 220.

In some embodiments, to generate service scaling instructions for instruction routing network nodes 220, the instruction routing network node 210 determines which down hierarchy component subgroupings are to be used for scaling. In some embodiments, to generate service scaling instructions for instruction routing network nodes 220, the instruction routing network node 210 determines how one or more down hierarchy component subgroupings scale, for example, using component subgrouping scaling factors for each affected service component subgrouping, where the component subgrouping scaling factors represent, for example, how each affected component subgrouping scales for a change in demand in services, for example, for the service of the HVE, or for the services of the component grouping of the component subgroup. In some embodiments, the instruction routing network node 210 does not determine how down hierarchy component subgroupings are to scale to generate the service scaling instructions for instruction routing network nodes 220. In some embodiments, the instruction routing network node 210 does not determine which down hierarchy component subgroupings are to be used for scaling to generate the service scaling instructions for instruction routing network nodes 220.

In some embodiments, to generate service scaling instructions for instruction routing network nodes 220, the instruction routing network node 210 determines which down hierarchy service components are to be used for scaling. In some embodiments, to generate service scaling instructions for instruction routing network nodes 220, the instruction routing network node 210 determines how one or more down hierarchy service components scale, for example, using service component scaling factors for each affected service component, where the service component scaling factors represent, for example, how each affected service component scales for a change in demand in services, for example, for the service of the HVE, for the services of the component grouping of the component subgroup of the service component, or for the services of the component subgroup of the service component. In some embodiments, the instruction routing network node 210 does not determine how down hierarchy service components are to scale to generate the service scaling instructions for instruction routing network nodes 220. In some embodiments, the instruction routing network node 210 does not determine which down hierarchy service components are to be used for scaling to generate the service scaling instructions for instruction routing network nodes 220.

In some embodiments, to generate service scaling instructions for instruction routing network nodes 220, the instruction routing network node 210 determines which down hierarchy resources of each down hierarchy service component are to be used for scaling. In some embodiments, to generate service scaling instructions for instruction routing network nodes 220, the instruction routing network node 210 determines how one or more down hierarchy resources scale, for example, using resource scaling factors for each affected resource, where the resource scaling factors represent, for example, how each affected resource scales for a change in demand in services, for example, for the service of the HVE, for the services of the component grouping of the component subgroup of the service component of the resource, for the services of the component subgroup of the service component of the resource, or for the services of the service component of the resource. In some embodiments, the instruction routing network node 210 does not determine how down hierarchy resources are to scale to generate the service scaling instructions for instruction routing network nodes 220. In some embodiments, the instruction routing network node 210 does not determine which down hierarchy resources of each down hierarchy service component are to be used for scaling to generate the service scaling instructions for instruction routing network nodes 220.

The instruction routing network node 210 incorporates information representing the determined scaling aspects and effects in the service scaling instructions for instruction routing network nodes 220. Furthermore, in some embodiments, for example, for planned HVE's, the instruction routing network node 210 also includes scheduling information in the service scaling instructions for instruction routing network nodes 220. In some embodiments, instruction routing network node 210 also includes a portion of the service scaling instructions received by instruction routing network node 210 in the service scaling instructions for instruction routing network nodes 220.

Referring to the example of FIG. 2, the instruction routing network node 210 provides the service scaling instructions for instruction routing network nodes 220 to instruction routing network nodes 220.

Based on the received service scaling instructions, the scaling engine of the instruction routing network nodes 220 generates service component instructions for each of the one or more service components 110 for which the instruction routing network nodes 220 is responsible. The service component instructions provide information used by the service components 110 for scaling. In addition, the scaling engine of instruction routing network nodes 220 transmits the generated service component instructions to the one or more service components 110 for which the instruction routing network nodes 220 is responsible. In response to the service component instructions, the service components 110 modify or schedule modifications to their service capacity of each of the resources 120 they manage.

Additionally, based on the received service scaling instructions, the dependency orchestrator of the instruction routing network nodes 220 determine service scaling instructions for instruction routing network nodes 230.

In some embodiments, to generate service scaling instructions for instruction routing network nodes 230, the instruction routing network nodes 220 determine which down hierarchy component groupings are to be used for scaling. In some embodiments, to generate service scaling instructions for instruction routing network nodes 230, the instruction routing network nodes 220 determine how one or more down hierarchy component groupings scale, for example, using component grouping scaling factors for each affected service component grouping, where the component grouping scaling factors represent, for example, how each affected component grouping scales for a change in demand in services, for example, for the service of the HVE. In some embodiments, the instruction routing network nodes 220 do not determine how down hierarchy component groupings are to scale to generate the service scaling instructions for instruction routing network nodes 230. In some embodiments, the instruction routing network nodes 220 do not determine which down hierarchy component groupings are to be used for scaling to generate the service scaling instructions for instruction routing network nodes 230.

In some embodiments, to generate service scaling instructions for instruction routing network nodes 230, the instruction routing network nodes 220 determine which down hierarchy component subgroupings are to be used for scaling. In some embodiments, to generate service scaling instructions for instruction routing network nodes 230, the instruction routing network nodes 220 determine how one or more down hierarchy component subgroupings scales, for example, using component subgrouping scaling factors for each affected service component subgrouping, where the component subgrouping scaling factors represent, for example, how each affected component subgrouping scales for a change in demand in services, for example, for the service of the HVE, or for the services of the component grouping of the component subgroup. In some embodiments, the instruction routing network nodes 220 do not determine how down hierarchy component subgroupings are to scale to generate the service scaling instructions for instruction routing network nodes 230. In some embodiments, the instruction routing network nodes 220 do not determine which down hierarchy component subgroupings are to be used for scaling to generate the service scaling instructions for instruction routing network nodes 230.

In some embodiments, to generate service scaling instructions for instruction routing network nodes 230, the instruction routing network nodes 220 determine which down hierarchy service components are to be used for scaling. In some embodiments, to generate service scaling instructions for instruction routing network nodes 230, the instruction routing network nodes 220 determine how one or more down hierarchy service components scale, for example, using service component scaling factors for each affected service component, where the service component scaling factors represent, for example, how each affected service component scales for a change in demand in services, for example, for the service of the HVE, for the services of the component grouping of the component subgroup of the service component, or for the services of the component subgroup of the service component. In some embodiments, the instruction routing network nodes 220 do not determine how down hierarchy service components are to scale to generate the service scaling instructions for instruction routing network nodes 230. In some embodiments, the instruction routing network nodes 220 do not determine which down hierarchy service components are to be used for scaling to generate the service scaling instructions for instruction routing network nodes 230.

In some embodiments, to generate service scaling instructions for instruction routing network nodes 230, the instruction routing network nodes 220 determine which down hierarchy resources of each down hierarchy service component are to be used for scaling. In some embodiments, to generate service scaling instructions for instruction routing network nodes 230, the instruction routing network nodes 220 determine how one or more down hierarchy resources scale, for example, using resource scaling factors for each affected resource, where the resource scaling factors represent, for example, how each affected resource scales for a change in demand in services, for example, for the service of the HVE, for the services of the component grouping of the component subgroup of the service component of the resource, for the services of the component subgroup of the service component of the resource, or for the services of the service component of the resource. In some embodiments, the instruction routing network nodes 220 do not determine how down hierarchy resources are to scale to generate the service scaling instructions for instruction routing network nodes 230. In some embodiments, the instruction routing network nodes 220 do not determine which down hierarchy resources of each down hierarchy service component are to be used for scaling to generate the service scaling instructions for instruction routing network nodes 230.

The instruction routing network nodes 220 incorporate information representing the determined scaling aspects and effects in the service scaling instructions for instruction routing network nodes 230. Furthermore, in some embodiments, for example, for planned HVE's, the instruction routing network nodes 220 also include scheduling information in the service scaling instructions for instruction routing network nodes 230. In some embodiments, instruction routing network nodes 220 also include a portion of the service scaling instructions respectively received by instruction routing network nodes 220 in the service scaling instructions for instruction routing network nodes 230.

Referring to the example of FIG. 2, the instruction routing network node 220 provide the service scaling instructions for instruction routing network nodes 230 to instruction routing network nodes 230.

Based on the received service scaling instructions, the scaling engine of the instruction routing network nodes 230 generate service component instructions for each of the one or more service components 110 for which the instruction routing network nodes 230 are responsible. The service component instructions provide information used by the service components 110 for scaling. In addition, the scaling engine of instruction routing network nodes 230 transmit the generated service component instructions to the one or more service components 110 for which the instruction routing network nodes 230 are responsible. In response to the service component instructions, the service components 110 modify or schedule modifications to their service capacity of each of the resources 120 they manage.

Additionally, based on the received service scaling instructions, the dependency orchestrator of one of the instruction routing network nodes 230 determines service scaling instructions for instruction routing network node 240.

In some embodiments, to generate service scaling instructions for instruction routing network node 240, the one instruction routing network node 230 determines which down hierarchy component groupings are to be used for scaling. In some embodiments, to generate service scaling instructions for instruction routing network node 240, the one instruction routing network node 230 determines how one or more down hierarchy component groupings scale, for example, using component grouping scaling factors for each affected service component grouping, where the component grouping scaling factors represent, for example, how each affected component grouping scales for a change in demand in services, for example, for the service of the HVE. In some embodiments, the one instruction routing network node 230 does not determine how down hierarchy component groupings are to scale to generate the service scaling instructions for instruction routing network node 240. In some embodiments, the one instruction routing network node 230 does not determine which down hierarchy component groupings are to be used for scaling to generate the service scaling instructions for instruction routing network node 240.

In some embodiments, to generate service scaling instructions for instruction routing network node 240, the one instruction routing network node 230 determines which down hierarchy component subgroupings are to be used for scaling. In some embodiments, to generate service scaling instructions for instruction routing network node 240, the one instruction routing network node 230 determines how one or more down hierarchy component subgroupings scale, for example, using component subgrouping scaling factors for each affected service component subgrouping, where the component subgrouping scaling factors represent, for example, how each affected component subgrouping scales for a change in demand in services, for example, for the service of the HVE, or for the services of the component grouping of the component subgroup. In some embodiments, the one instruction routing network node 230 does not determine how down hierarchy component subgroupings are to scale to generate the service scaling instructions for instruction routing network node 240. In some embodiments, the one instruction routing network node 230 does not determine which down hierarchy component subgroupings are to be used for scaling to generate the service scaling instructions for instruction routing network node 240.

In some embodiments, to generate service scaling instructions for instruction routing network node 240, the one instruction routing network node 230 determines which down hierarchy service components are to be used for scaling. In some embodiments, to generate service scaling instructions for instruction routing network node 240, the one instruction routing network node 230 determines how one or more down hierarchy service components scale, for example, using service component scaling factors for each affected service component, where the service component scaling factors represent, for example, how each affected service component scales for a change in demand in services, for example, for the service of the HVE, for the services of the component grouping of the component subgroup of the service component, or for the services of the component subgroup of the service component. In some embodiments, the one instruction routing network node 230 does not determine how down hierarchy service components are to scale to generate the service scaling instructions for instruction routing network node 240. In some embodiments, the one instruction routing network node 230 does not determine which down hierarchy service components are to be used for scaling to generate the service scaling instructions for instruction routing network node 240.

In some embodiments, to generate service scaling instructions for instruction routing network node 240, the one instruction routing network node 230 determines which down hierarchy resources of each down hierarchy service component are to be used for scaling. In some embodiments, to generate service scaling instructions for instruction routing network node 240, the one instruction routing network node 230 determines how one or more down hierarchy resources scale, for example, using resource scaling factors for each affected resource, where the resource scaling factors represent, for example, how each affected resource scales for a change in demand in services, for example, for the service of the HVE, for the services of the component grouping of the component subgroup of the service component of the resource, for the services of the component subgroup of the service component of the resource, or for the services of the service component of the resource. In some embodiments, the one instruction routing network node 230 does not determine how down hierarchy resources are to scale to generate the service scaling instructions for instruction routing network node 240. In some embodiments, the one instruction routing network node 230 does not determine which down hierarchy resources of each down hierarchy service component are to be used for scaling to generate the service scaling instructions for instruction routing network node 240.

The one instruction routing network node 230 incorporates information representing the determined scaling aspects and effects in the service scaling instructions for instruction routing network node 240. Furthermore, in some embodiments, for example, for planned HVE's, the one instruction routing network node 230 also includes scheduling information in the service scaling instructions for instruction routing network node 240. In some embodiments, the one instruction routing network node 230 also includes a portion of the service scaling instructions received by the one instruction routing network node 230 in the service scaling instructions for instruction routing network node 240.

Referring to the example of FIG. 2, the one instruction routing network node 230 provides the service scaling instructions for instruction routing network node 240 to instruction routing network node 240.

Based on the received service scaling instructions, the scaling engine of the instruction routing network node 240 generates service component instructions for each of the one or more service components 110 for which the instruction routing network node 240 is responsible. The service component instructions provide information used by the service components 110 for scaling. In addition, the scaling engine of instruction routing network node 240 transmit the generated service component instructions to the one or more service components 110 for which the instruction routing network node 240 is responsible. In response to the service component instructions, the service components 110 modify or schedule modifications to their service capacity of each of the resources 120 they manage.

Instruction routing network node 240 does not determine service scaling instructions for down hierarchy instruction routing network nodes because it has none. But if instruction routing network node 240 were connected to downstream hierarchy instruction routing network nodes, it would determine service scaling instructions for the downstream hierarchy instruction routing network nodes, and transmit them thereto.

In alternative embodiments, one or more instruction routing network nodes do not generate and transmit service component instructions two service components. For example, one or more instruction routing network nodes may receive scaling instructions, and, based on the received scaling instructions, generate scaling instructions for one or more down hierarchy instruction routing network nodes.

Figure 3:
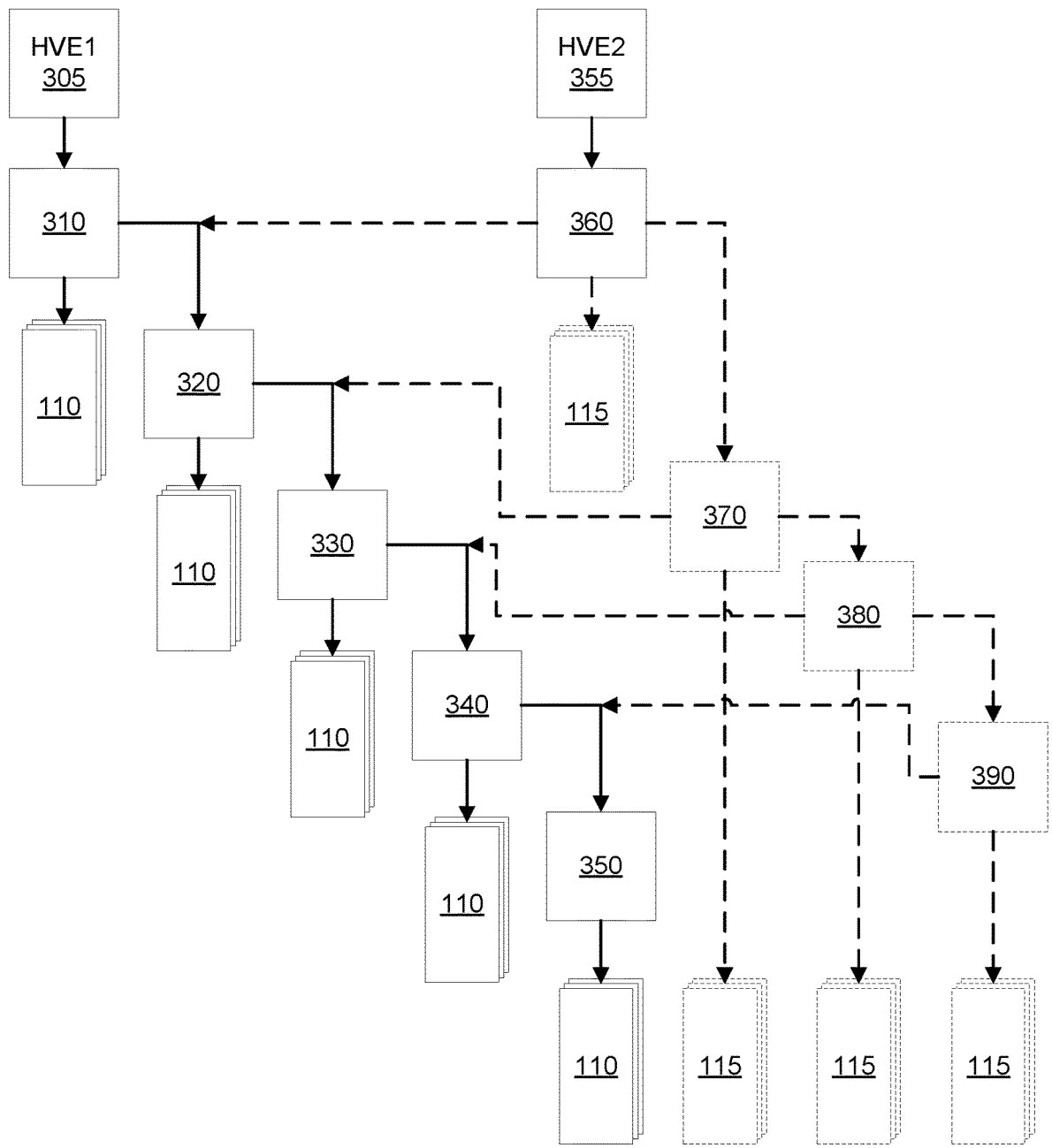
FIG. 3 is a schematic block diagram illustrating scaling systems for automatically scaling a number of service components.

FIG. 3 is a schematic block diagram illustrating multiple hierarchies of instruction routing network nodes for scaling service capacity of service components 110 for first and second HVE's 305 and 355. Either or both of HVE's 305 and 355 may be related to an increase in viewership expected from, for example, special programming. In some embodiments, either or both of HVE's 305 and 335 may be related to other types of services.

In some embodiments, instruction routing network node 310 is responsible for scaling service components 110, which are responsible for a website where a user can sign-up for viewing HVE 305, instruction routing network node 320 is responsible for scaling service components 110, which are responsible for a payments for HVE 305, instruction routing network node 330 is responsible for scaling service components 110, which are responsible for data entry for payments for HVE 305, instruction routing network node 340 is responsible for scaling service components 110, which are responsible for managing preferences for payments for HVE 305, instruction routing network node 350 is responsible for scaling service components 110, which are responsible for storing preferences for viewing HVE 305.

In some embodiments, instruction routing network node 360 is responsible for scaling service components 115, which are responsible for payments for HVE 355. In some embodiments, instruction routing network node 370 is responsible for scaling service components 115, which are responsible for data entry for payments for HVE 355. In some embodiments, instruction routing network node 380 is responsible for scaling service components 115, which are responsible for managing preferences for payments for HVE 355. In some embodiments, instruction routing network node 390 is responsible for scaling service components 115, which are responsible for storing preferences for viewing HVE 355.

The service scaling system incorporates information representing scaling aspects and effects in the service scaling instructions for instruction routing network node 310 for HVE 305. Furthermore, in some embodiments, the service scaling system also includes scheduling information in the service scaling instructions for instruction routing network node 310 for HVE 305. The service scaling system provides the service scaling instructions for instruction routing network node 310 to instruction routing network node 310.

The service scaling system incorporates information representing scaling aspects and effects in the service scaling instructions for instruction routing network node 360 for HVE 355. Furthermore, in some embodiments, the service scaling system also includes scheduling information in the service scaling instructions for instruction routing network node 360 for HVE 355. The service scaling system provides the service scaling instructions for instruction routing network node 360 to instruction routing network node 360.

Based on the received service scaling instructions, the scaling engine of the instruction routing network node 310 generates service component instructions for each of the one or more service components 110 for which the instruction routing network node 310 is responsible. The service component instructions provide information used by the service components 110 for scaling. In addition, the scaling engine of instruction routing network node 310 transmits the generated service component instructions to the one or more service components 110 for which the instruction routing network node 310 is responsible. In response to the service component instructions, the service components 110 modify or schedule modifications to their service capacity of each of the resources they manage.

Additionally, based on the received service scaling instructions, the dependency orchestrator of the instruction routing network node 310 determines service scaling instructions for instruction routing network node 320, for example, using techniques discussed elsewhere herein. The instruction routing network node 310 incorporates information representing the determined scaling aspects and effects in the service scaling instructions for instruction routing network node 320. Furthermore, in some embodiments, the instruction routing network node 310 also includes scheduling information in the service scaling instructions for instruction routing network node 320. In addition, the instruction routing network node 310 provides the service scaling instructions for instruction routing network node 320 to instruction routing network node 320.

In some embodiments, based on the received service scaling instructions, the scaling engine of the instruction routing network node 360 generates service component instructions for each of the one or more service components 115 for which the instruction routing network node 360 is responsible. The service component instructions provide information used by the service components 115 for scaling. In addition, the scaling engine of instruction routing network node 360 transmits the generated service component instructions to the one or more service components 115 for which the instruction routing network node 360 is responsible. In response to the service component instructions, the service components 115 modify or schedule modifications to their service capacity of each of the resources they manage.

In some embodiments, based on the received service scaling instructions, the dependency orchestrator of the instruction routing network node 360 determines service scaling instructions either for instruction routing network node 320 or for instruction routing network node 370, for example, using techniques discussed elsewhere herein. The instruction routing network node 360 incorporates information representing the determined scaling aspects and effects in the service scaling instructions for instruction routing network node 320 or for instruction routing network node 370. Furthermore, in some embodiments, the instruction routing network node 360 also includes scheduling information in the service scaling instructions for instruction routing network node 320 or for instruction routing network node 370. In addition, the instruction routing network node 360 provides the service scaling instructions for instruction routing network node 320 to instruction routing network node 320 or for instruction routing network node 370.

Based on the received service scaling instructions, the scaling engine of the instruction routing network node 320 generates service component instructions for each of the one or more service components 110 for which the instruction routing network node 320 is responsible. The service component instructions provide information used by the service components 110 for scaling. In addition, the scaling engine of instruction routing network node 320 transmits the generated service component instructions to the one or more service components 110 for which the instruction routing network node 320 is responsible. In response to the service component instructions, the service components 110 modify or schedule modifications to their service capacity of each of the resources they manage.

Additionally, based on the received service scaling instructions, the dependency orchestrator of the instruction routing network node 320 determines service scaling instructions for instruction routing network node 330, for example, using techniques discussed elsewhere herein. The instruction routing network node 320 incorporates information representing the determined scaling aspects and effects in the service scaling instructions for instruction routing network node 330. Furthermore, in some embodiments, the instruction routing network node 320 also includes scheduling information in the service scaling instructions for instruction routing network node 330. In addition, the instruction routing network node 320 provides the service scaling instructions for instruction routing network node 330 to instruction routing network node 330.

In some embodiments, based on the received service scaling instructions, the scaling engine of the instruction routing network node 370 generates service component instructions for each of the one or more service components 115 for which the instruction routing network node 370 is responsible. The service component instructions provide information used by the service components 115 for scaling. In addition, the scaling engine of instruction routing network node 370 transmits the generated service component instructions to the one or more service components 115 for which the instruction routing network node 370 is responsible. In response to the service component instructions, the service components 115 modify or schedule modifications to their service capacity of each of the resources they manage.

In some embodiments, based on the received service scaling instructions, the dependency orchestrator of the instruction routing network node 370 determines service scaling instructions either for instruction routing network node 330 or for instruction routing network node 380, for example, using techniques discussed elsewhere herein. The instruction routing network node 370 incorporates information representing the determined scaling aspects and effects in the service scaling instructions for instruction routing network node 330 or for instruction routing network node 380. Furthermore, in some embodiments, the instruction routing network node 370 also includes scheduling information in the service scaling instructions for instruction routing network node 330 or for instruction routing network node 380. In addition, the instruction routing network node 370 provides the service scaling instructions for instruction routing network node 330 to instruction routing network node 330 or for instruction routing network node 380.

Based on the received service scaling instructions, the scaling engine of the instruction routing network node 330 generates service component instructions for each of the one or more service components 110 for which the instruction routing network node 330 is responsible. The service component instructions provide information used by the service components 110 for scaling. In addition, the scaling engine of instruction routing network node 330 transmits the generated service component instructions to the one or more service components 110 for which the instruction routing network node 330 is responsible. In response to the service component instructions, the service components 110 modify or schedule modifications to their service capacity of each of the resources they manage.

Additionally, based on the received service scaling instructions, the dependency orchestrator of the instruction routing network node 330 determines service scaling instructions for instruction routing network node 340, for example, using techniques discussed elsewhere herein. The instruction routing network node 330 incorporates information representing the determined scaling aspects and effects in the service scaling instructions for instruction routing network node 340. Furthermore, in some embodiments, the instruction routing network node 330 also includes scheduling information in the service scaling instructions for instruction routing network node 340. In addition, the instruction routing network node 330 provides the service scaling instructions for instruction routing network node 340 to instruction routing network node 340.

In some embodiments, based on the received service scaling instructions, the scaling engine of the instruction routing network node 380 generates service component instructions for each of the one or more service components 115 for which the instruction routing network node 380 is responsible. The service component instructions provide information used by the service components 115 for scaling. In addition, the scaling engine of instruction routing network node 380 transmits the generated service component instructions to the one or more service components 115 for which the instruction routing network node 380 is responsible. In response to the service component instructions, the service components 115 modify or schedule modifications to their service capacity of each of the resources they manage.

In some embodiments, based on the received service scaling instructions, the dependency orchestrator of the instruction routing network node 380 determines service scaling instructions either for instruction routing network node 340 or for instruction routing network node 390, for example, using techniques discussed elsewhere herein. The instruction routing network node 380 incorporates information representing the determined scaling aspects and effects in the service scaling instructions for instruction routing network node 340 or for instruction routing network node 390. Furthermore, in some embodiments, the instruction routing network node 380 also includes scheduling information in the service scaling instructions for instruction routing network node 340 or for instruction routing network node 390. In addition, the instruction routing network node 380 provides the service scaling instructions for instruction routing network node 340 to instruction routing network node 340 or for instruction routing network node 390.

Based on the received service scaling instructions, the scaling engine of the instruction routing network node 340 generates service component instructions for each of the one or more service components 110 for which the instruction routing network node 340 is responsible. The service component instructions provide information used by the service components 110 for scaling. In addition, the scaling engine of instruction routing network node 340 transmits the generated service component instructions to the one or more service components 110 for which the instruction routing network node 340 is responsible. In response to the service component instructions, the service components 110 modify or schedule modifications to their service capacity of each of the resources they manage.

Additionally, based on the received service scaling instructions, the dependency orchestrator of the instruction routing network node 340 determines service scaling instructions for instruction routing network node 350, for example, using techniques discussed elsewhere herein. The instruction routing network node 340 incorporates information representing the determined scaling aspects and effects in the service scaling instructions for instruction routing network node 350. Furthermore, in some embodiments, the instruction routing network node 330 also includes scheduling information in the service scaling instructions for instruction routing network node 350. In addition, the instruction routing network node 340 provides the service scaling instructions for instruction routing network node 350 to instruction routing network node 350.

In some embodiments, based on the received service scaling instructions, the scaling engine of the instruction routing network node 390 generates service component instructions for each of the one or more service components 115 for which the instruction routing network node 390 is responsible. The service component instructions provide information used by the service components 115 for scaling. In addition, the scaling engine of instruction routing network node 390 transmits the generated service component instructions to the one or more service components 115 for which the instruction routing network node 390 is responsible. In response to the service component instructions, the service components 115 modify or schedule modifications to their service capacity of each of the resources they manage.

In some embodiments, based on the received service scaling instructions, the dependency orchestrator of the instruction routing network node 390 determines service scaling instructions either for instruction routing network node 350, for example, using techniques discussed elsewhere herein. The instruction routing network node 390 incorporates information representing the determined scaling aspects and effects in the service scaling instructions for instruction routing network node 350. Furthermore, in some embodiments, the instruction routing network node 390 also includes scheduling information in the service scaling instructions for instruction routing network node 350. In addition, the instruction routing network node 390 provides the service scaling instructions for instruction routing network node 350 to instruction routing network node 350.

Based on the received service scaling instructions, the scaling engine of the instruction routing network node 350 generates service component instructions for each of the one or more service components 110 for which the instruction routing network node 350 is responsible. The service component instructions provide information used by the service components 110 for scaling. In addition, the scaling engine of instruction routing network node 350 transmits the generated service component instructions to the one or more service components 110 for which the instruction routing network node 350 is responsible. In response to the service component instructions, the service components 110 modify or schedule modifications to their service capacity of each of the resources they manage.

Figure 4:
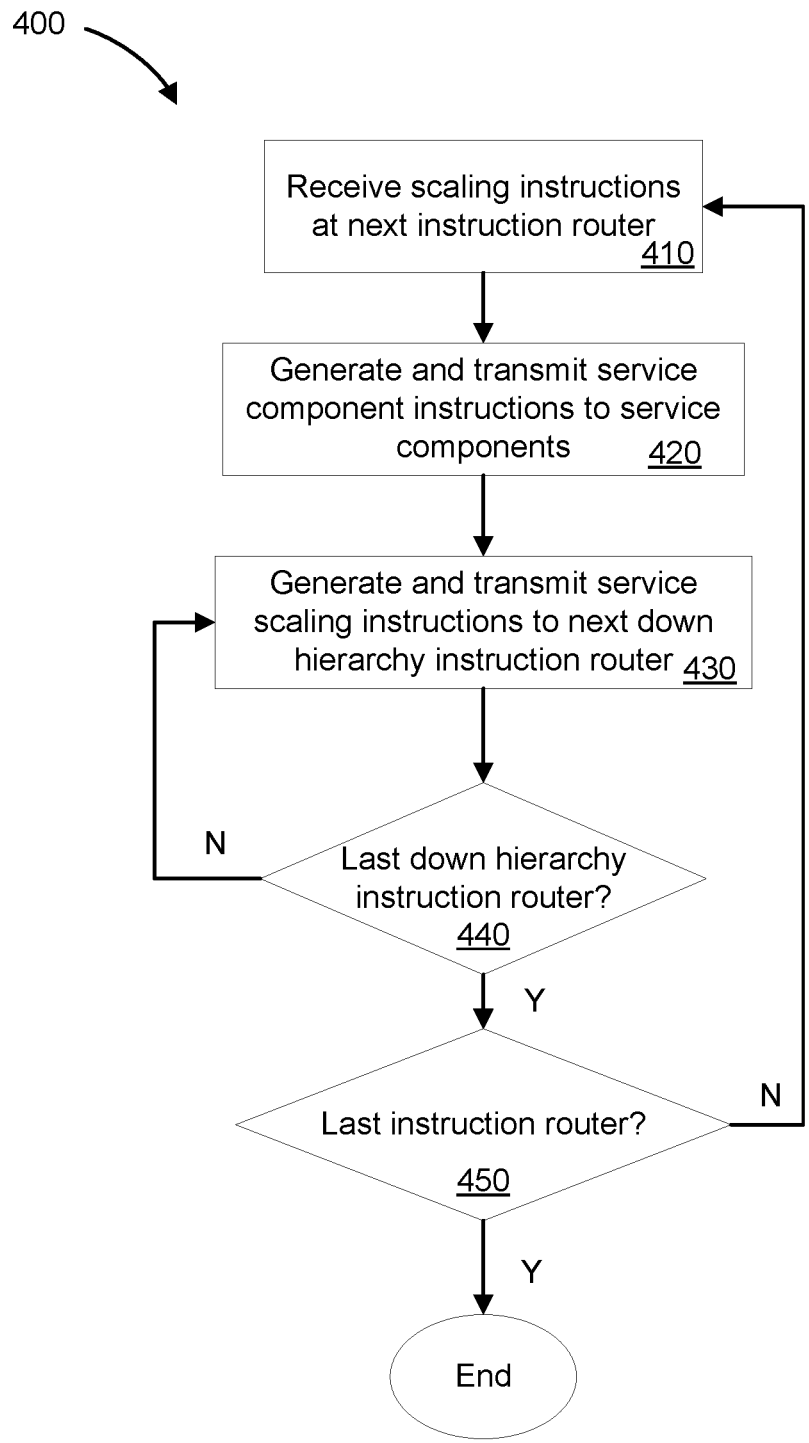
FIG. 4 is a schematic block diagram illustrating a scaling system for automatically scaling a number of service components.

FIG. 4 is a schematic flowchart diagram illustrating a process 400 for scaling a service with a service scaling system. Some or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. For example, the process 400 may be performed, for example, by service scaling system 150 or another service scaling system.

At 410, service scaling instructions are received at a next instruction routing network node. For example, service scaling instructions, for example, having characteristics similar or identical to the characteristics of the service scaling instructions described elsewhere herein received at a next instruction routing network node of a hierarchy of instruction routing network nodes, where the instruction routing network nodes have characteristics similar or identical to characteristics of the instruction routing network nodes described elsewhere herein.

At 420, the next instruction routing network node generates service component instructions for one or more service components. The next instruction routing network node may generate the service component instructions using techniques and aspects for service component instruction generation having characteristics similar or identical to the characteristics of the service component instruction generation techniques described elsewhere herein. In addition, the next instruction routing network node transmits the service component instructions to the one or more service components.

At 430, based on the hierarchy having additional instruction routing network nodes immediately down hierarchy of the next instruction routing network node having not received scaling instructions for the HVE, the next instruction routing network node generates service scaling instructions for a next instruction routing network node immediately down hierarchy of the next instruction routing network node. The next instruction routing network node may generate the service scaling instructions using techniques and aspects for service scaling instruction generation having characteristics similar or identical to the characteristics of the service scaling instruction generation techniques described elsewhere herein. In addition, the next instruction routing network node transmits the service scaling instructions to the next instruction routing network node immediately down hierarchy of the next instruction routing network node.

At 440, the next instruction routing network node determines whether an additional instruction routing network node immediately down hierarchy of the next instruction routing network node has not received scaling instructions for the HVE. If the next instruction routing network node determines that an additional instruction routing network node immediately down hierarchy of the next instruction routing network node has not received scaling instructions for the HVE, process 400 returns to 430. If the next instruction routing network node determines that all instruction routing network nodes immediately down hierarchy of the next instruction routing network node have received scaling instructions for the HVE, process 400 proceeds to 450.

At 450, the service scaling system determines whether an additional instruction routing network node has not received scaling instructions for the HVE. If the service scaling system determines that an additional instruction routing network node has not received scaling instructions for the HVE, process 400 returns to 410. If the service scaling system determines that all instruction routing network nodes have received scaling instructions for the HVE, process 400 ends.

Figure 5:
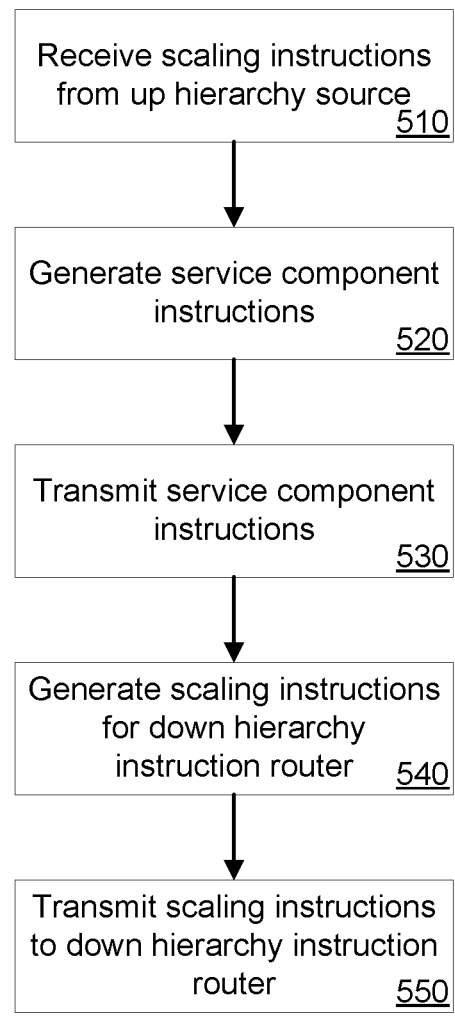
FIG. 5 is a method of using a service providing system.

FIG. 5 is a schematic flowchart diagram illustrating a process 500 for scaling a service with a service scaling system. In some embodiments, the process 500 may be performed, for example, by an instruction routing network node 220, 230 of service scaling system 150 or an instruction routing network node of another service scaling system.

At 510, service scaling instructions are received at the instruction routing network node. For example, service scaling instructions, for example, having characteristics similar or identical to the characteristics of the service scaling instructions described elsewhere herein received at the instruction routing network node of a hierarchy of instruction routing network nodes, where the instruction routing network nodes have characteristics similar or identical to characteristics of the instruction routing network nodes described elsewhere herein.

At 520, the instruction routing network node generates service component instructions for one or more service components. The instruction routing network node may generate the service component instructions using techniques and aspects for service component instruction generation having characteristics similar or identical to the characteristics of the service component instruction generation techniques described elsewhere herein.

At 530, the instruction routing network node transmits the service component instructions to the one or more service components.

At 540, based on the hierarchy having additional instruction routing network nodes immediately down hierarchy of the instruction routing network node having not received scaling instructions for the HVE, the instruction routing network node generates service scaling instructions for a next instruction routing network node immediately down hierarchy of the instruction routing network node. The instruction routing network node may generate the service scaling instructions using techniques and aspects for service scaling instruction generation having characteristics similar or identical to the characteristics of the service scaling instruction generation techniques described elsewhere herein.

At 550, the instruction routing network node transmits the service scaling instructions to the next instruction routing network node immediately down hierarchy of the next instruction routing network node.

Figure 6:
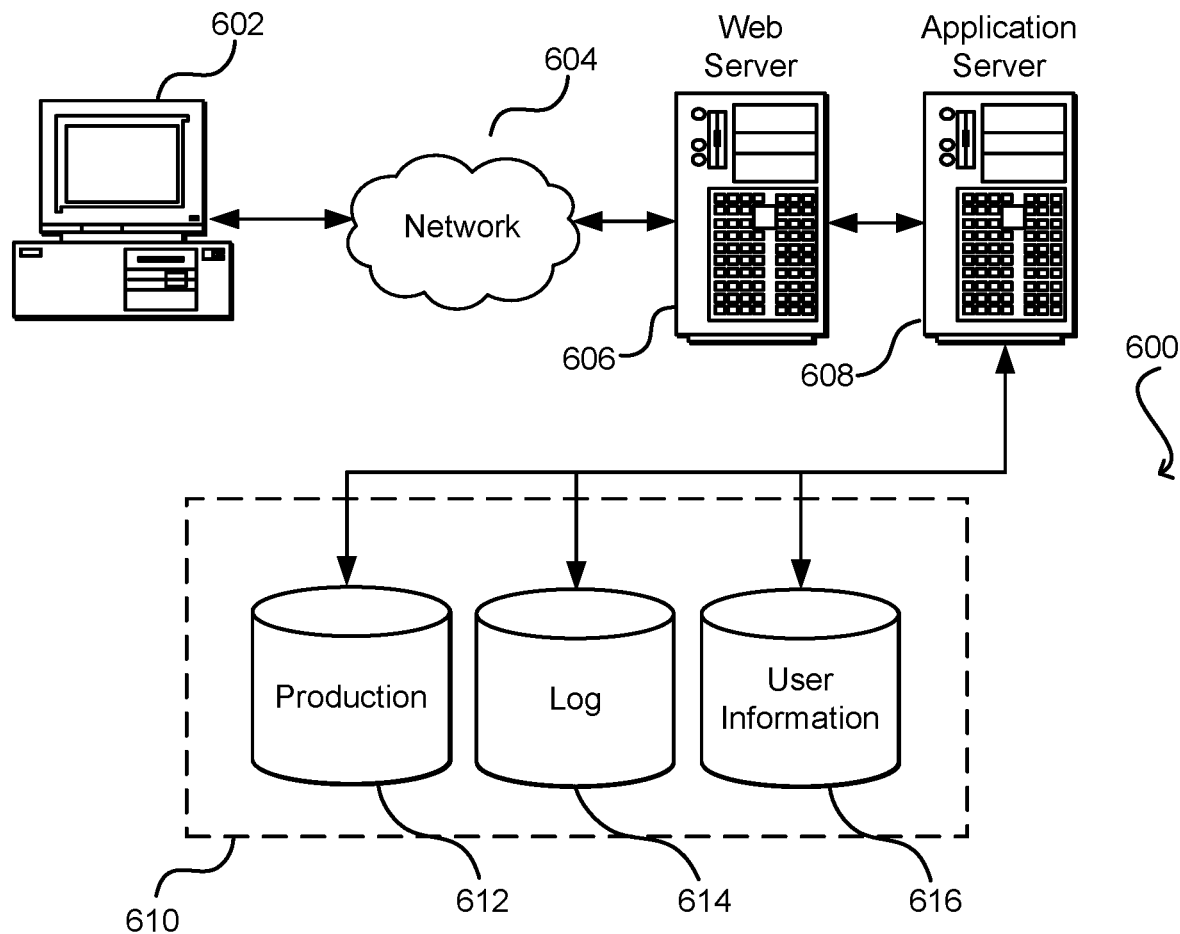
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a result listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
one or more processors; and
one or more memories storing instructions that, upon execution by the one or more processors, configure:
a first set of service components to perform a first service function; and
a second set of service components to perform a second service function;
a first instruction routing network node associated with the first service function; and
a second instruction routing network node associated with the second service function,
wherein the first instruction routing network node is configured to:
receive event information characterizing a demand change event, the event information describing a demand or a change in demand in service capacity for the demand change event,
generate first service component instructions based at least in part on the event information,
transmit the first service component instructions to the first set of service components, the first service component instructions causing the first set of service components to change a service capacity of the first set of service components, generate first scaling instructions based at least in part on the event information, and
transmit the first scaling instructions to the second instruction routing network node,
wherein the second instruction routing network node is configured to:
receive the first scaling instructions,
generate second service component instructions based at least in part on the first scaling instructions, and
transmit the second service component instructions to the second set of service components, the second service component instructions causing the second set of service components to change a service capacity of the second set of service components.

2. The system of claim 1, wherein the first and second service functions are collectively configured to provide at least a portion of a scalable service.

3. The system of claim 1, further comprising:
a third set of service components configured to perform a third service function; and
a third instruction routing network node associated with the third service function,
wherein the second instruction routing network node is further configured to:
generate second scaling instructions based at least in part on the first scaling instructions, and
transmit the second scaling instructions to the third instruction routing network node,
wherein the third instruction routing network node is configured to:
receive the second scaling instructions,
generate third service component instructions based at least in part on the second scaling instructions, and
transmit the third service component instructions to the third set of service components, the third service component instructions causing the third set of service components to change a service capacity of the third set of service components.

4. The system of claim 1, wherein the first service component instructions identify the change in a service capacity of the first set of service components.

5. A computer-implemented method, comprising:
receiving, with a first instruction routing network node, event information characterizing a demand change event, the event information describing a demand or a change in demand in service capacity for the demand change event, the first instruction routing network node being associated with a first service function;
changing, with the first instruction routing network node, a service capacity of a first set of service components based at least in part on the event information;
generating, with the first instruction routing network node, first scaling instructions based at least in part on the event information;
transmitting, with the first instruction routing network node, the first scaling instructions to a second instruction routing network node, the second instruction routing network node being associated with a second service function; and
changing, with the second instruction routing network node, a service capacity of a second set of service components based at least in part on the first scaling instructions.

6. The computer-implemented method of claim 5, further comprising, providing at least a portion of a scalable service with the first and second service functions.

7. The computer-implemented method of claim 5, further comprising:
receiving, with a third instruction routing network node, second event information characterizing a second demand change event, the second event information describing a second demand or a change in demand in service capacity for the second demand change event, the third instruction routing network node being associated with a third service function;

changing, with the third instruction routing network node, a service capacity of a third set of service components based at least in part on the event information;

generating, with the third instruction routing network node, third scaling instructions based at least in part on the second event information;

transmitting, with the third instruction routing network node, the third scaling instructions to the second instruction routing network node; and changing, with the second instruction routing network node, a service capacity of the second set of service components based at least in part on the third scaling instructions.

8. The computer-implemented method of claim 5, wherein the service capacity of at least one of the first and second sets of services is changed at least partly automatically in response to receiving the event information.

9. The computer-implemented method of claim 5, further comprising identifying, with the first scaling instructions, a change in a service capacity of the second set of service components.

10. The computer-implemented method of claim 5, further comprising calculating, with the first instruction routing network node, a portion of the first scaling instructions identifying a change in service capacity of one of the second set of service components based on one or more scaling factors representing a change in the service capacity of the one second service component for a unit change in demand in a service capacity of the demand change event.

11. The computer-implemented method of claim 5, further comprising:

receiving the event information from a scaling interface; and providing a scaling notification to the scaling interface, the scaling notification indicating that the service capacity of at least one of the first and second sets of service components is at least partly changed.

12. The computer-implemented method of claim 11, further comprising:

receiving, with the first instruction routing network node, additional event 2 information characterizing the demand change event, the additional event information describing an additional demand or a change in demand in service capacity for the demand change event;

changing, with the first instruction routing network node, the service capacity of the first set of service components based at least in part on the additional event information;

generating, with the first instruction routing network node, third scaling instructions based at least in part on the additional event information;

transmitting, with the first instruction routing network node, the third scaling instructions to the second instruction routing network node; and changing, with the second instruction routing network node, the service capacity of the second set of service components based at least in part on the third scaling instructions.

13. A computer-readable storage medium storing computer-executable instructions that, when executed by one or more processors of a first instruction routing network node, cause the first instruction routing network node to:

receive first scaling instructions associated with a demand change event;

change a service capacity of a first set of service components based at least in part on the first scaling instructions;

generate second scaling instructions based at least in part on the first scaling instructions; and transmit the second scaling instructions to a second instruction routing network node, the second scaling instructions causing the second instruction routing network node to change a service capacity of a second set of service components.

14. The computer-readable storage medium of claim 13, the computer-executable instructions further causing the service capacity of the first and second sets of service components to increase to provide at least a portion of a scalable service.

15. The computer-readable storage medium of claim 13, the computer-executable instructions further causing the second instruction routing network node to:

generate third scaling instructions based at least in part on the second scaling instructions, and transmit the third scaling instructions to a third instruction routing network node, the third scaling instructions causing the third instruction routing network node to change a service capacity of a third set of service components.

16. The computer-readable storage medium of claim 13, the computer-executable instructions further causing the first instruction routing network node to transmit service component instructions to the first set of service components, the service component instructions identifying the change in a service capacity of the set of first service components.

17. The computer-readable storage medium of claim 13, the computer-executable instructions further causing the first instruction routing network node to generate the second scaling instructions such that the second scaling instructions identify the change in a service capacity of the second set of service components.

18. The computer-readable storage medium of claim 13, the computer-executable instructions further causing the first instruction routing network node to calculate the change in the service capacity of the first set of service components based on one or more scaling factors representing the service capacity of the first set of service components for a unit change in demand in a service capacity of the demand change event.

19. The computer-readable storage medium of claim 13, the computer-executable instructions further causing the first instruction routing network node to generate the second scaling instructions such that the second scaling instructions provide information for calculating the change in a service capacity of the second set of service components.

20. The computer-readable storage medium of claim 19, the computer-executable instructions further causing the first instruction routing network node to generate service component instructions for the first set of service components, the service component instructions providing information for calculating the change in a service capacity of the first set of service components.

* * * * *

UNITED STATES PATENT AND TRADEMARK OFFICE
CERTIFICATE OF CORRECTION

| | | |
|---|---|---|
| PATENT NO. | : 12,119,997 B1 | Page 1 of 1 |
| APPLICATION NO. | : 18/211875 | |
| DATED | : October 15, 2024 | |
| INVENTOR(S) | : Abhinav A Agshikar et al. | |

It is certified that error appears in the above-identified patent and that said Letters Patent is hereby corrected as shown below:

In the Claims

Claim 12 - Column 27 Line 43:
Delete: "2"

Signed and Sealed this
Tenth Day of February, 2026

John A. Squires
*Director of the United States Patent and Trademark Office*